W. F. PENROD.
DRIVING GEAR SYSTEM.
APPLICATION FILED FEB. 21, 1920.

1,384,483.

Patented July 12, 1921.
2 SHEETS—SHEET 1.

INVENTOR:
William Franklin Penrod
BY
R. M. Hosea
ATTORNEY.

UNITED STATES PATENT OFFICE.

WILLIAM FRANKLIN PENROD, OF CINCINNATI, OHIO, ASSIGNOR TO ANTHONY J. WISSEL, TRUSTEE.

DRIVING-GEAR SYSTEM.

1,384,483. Specification of Letters Patent. Patented July 12, 1921.

Application filed February 21, 1920. Serial No. 360,456.

*To all whom it may concern:*

Be it known that I, WILLIAM FRANKLIN PENROD, a citizen of the United States, residing at Cincinnati, in the county of Hamilton and State of Ohio, have invented new and useful Improvements in Driving-Gear Systems, of which the following is a specification.

My invention contemplates, primarily, what may be termed a structural unit for power-driven vehicles, embodying an improved system of power-transmission in a construction and an arrangement of comparatively few parts, operating as a whole with a minimum of friction and admitting a maximum of gear-reduction without minimizing road-clearance. Without material change, a plurality of speed-changes may be had; but the invention, while especially applicable to heavy haulage; as for industrial trucks, without resort to "worm gear", is applicable also to ordinary cars.

Figure 1:
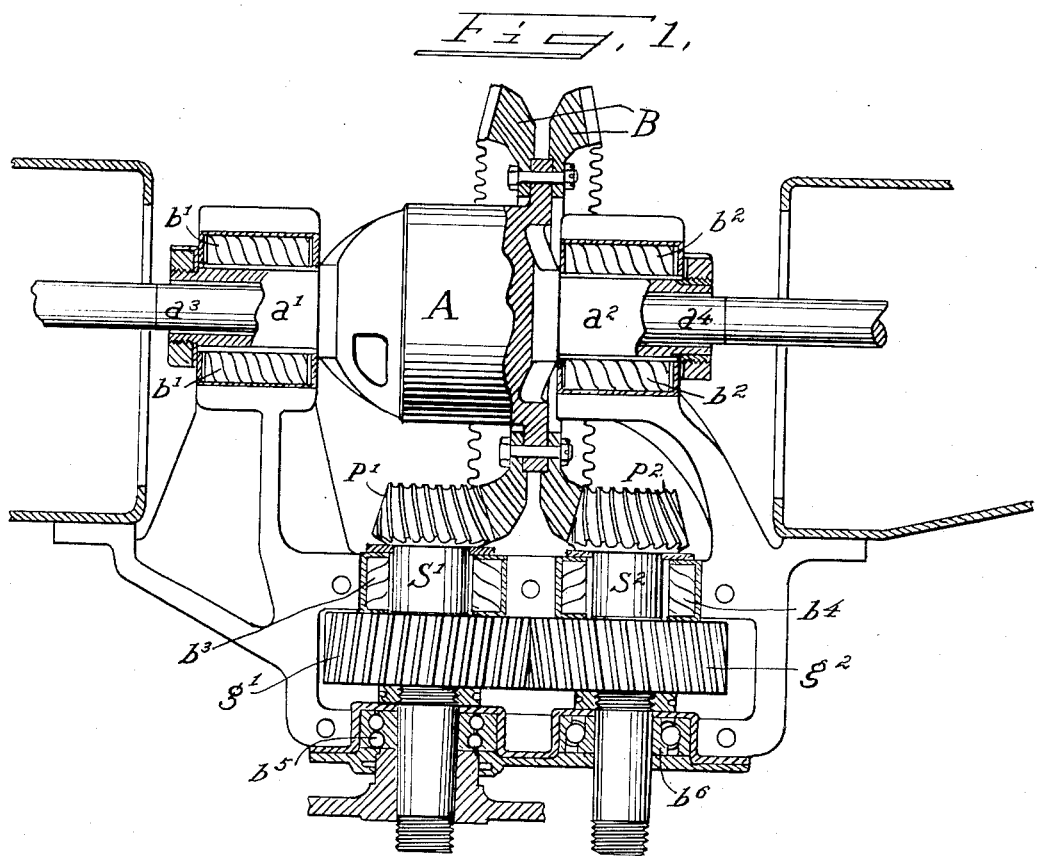
Figure 2:
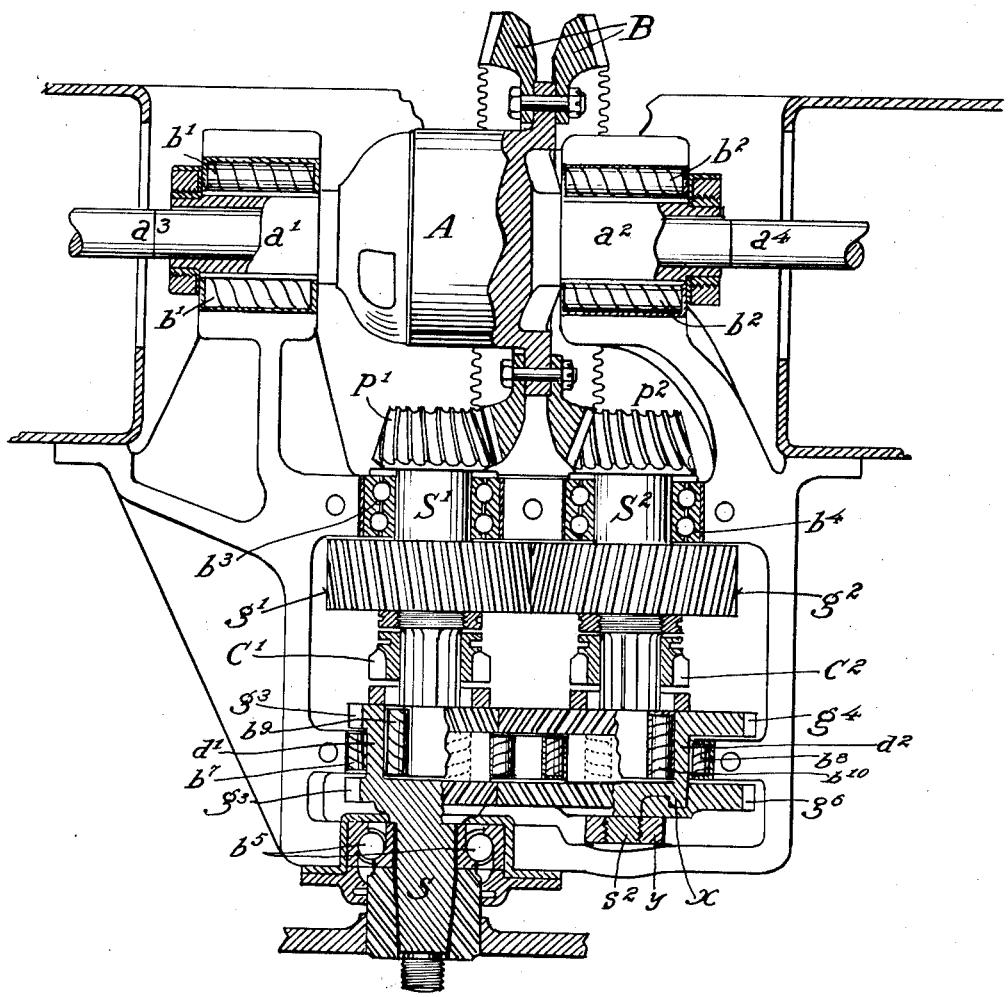

My invention is illustrated in the accompanying drawings in which Figure 1 presents a plan view, partly sectioned, of a single speed system; and Fig. 2, a plan view of the same with added parts giving a second speed drive.

In the accompanying drawings illustrative of my invention in preferred form, "A" in Fig. 1, Sheet 1, designates the differential casing; "$a^1$, $a^2$", its sleeve extensions carried in bearings "$b^1$, $b^2$" (preferably of the Hyatt type); and "$a^3$ $a^4$", the axle shafts, which have their bearings upon the rear arms $f^1$ $f^2$ of a yoke-shaped frame, F, pivotally connected with the axle-casing and extended forward and connected across by integral extensions $f^3$, $f^4$, constituting the U portion of the yoke.

Secured to the differential casing "A" is a double helical-cut bevel-gear "B" (which may be two duplicate gears joined back to back as one), in permanent mesh at opposite sides each to each with two corresponding helical-cut bevel-pinions "$p^1$ $p^2$", attached to the rear ends of or formed integral with duplicate parallel shafts "$S^1$ $S^2$"—(the former being the motor shaft and the latter an auxiliary) carried in bearings "$b^3$ $b^4$" adjacent to the pinions, and bearings "$b^5$ $b^6$" at or near the front ends of the shafts.

The shafts $S^1$, $S^2$, have their terminal bearings $b^3$, $b^4$, on the cross bar $f^4$, immediately adjacent to the pinions $P^1$, $P^2$. Immediately forward and adjacent to these bearings are the spur gears $g^1$, $g^2$, which thus utilize the bearings $b^3$, $b^4$, in common with the bevel pinions $p^1$, $p^2$.

The gears $g^1$, $g^2$ have their own forward bearings immediately adjacent upon the rear cross bar $f^4$ of the yoke-frame. The integral yoke-frame, with its bearings for the driven axle and for the differential carrying the bevel gear B; and also the bearings for the bevel pinions $P^1$, $P^2$, and the permanent coordinating gears $g^1$, $g^2$, thus constitutes a firm, compact and unyielding base for the several driving and driven elements, insuring a perfect alinement under all circumstances, thus minimizing wear.

This condition also aids and renders more complete and perfect the absorption of the end-thrust resulting from the use of angular or helical cut teeth. Thus, in the disposition of the gears shown in Fig. 1, and, supposing an application of power through the main shaft in the usual rotative direction to the right, the bevel pinion $p^1$, will thrust downward while the helical gear $g^1$ will thrust upward; whereas, pinion $p^2$ being in opposite rotation thrusts upward and gear $g^2$ downward. These thrusts being opposite balance each other. I believe myself to be the first to overcome the end-thrust of bevel gearing by helical cut spur-gears. This is rendered possible by the fact that the bevel gearing, being duplicates in structure, operate with opposite end-thrusts due to the difference in rotative direction; while the helical gears $g^1$, $g^2$, being opposite to each other and being "rights" and "lefts" in order to mesh, have corresponding opposite thrusts; thus attaining a complete balancing as to the two sets of gears in the relation shown, rendering special thrust bearings unnecessary.

It will be of course understood that the bevel gears $P^1$, $P^2$ are duplicates and their teeth may be inclined alike right or left, as the case may be, while the initial spur gear $g^1$ must have teeth of the opposite inclination thereto and to its own intermeshing companion gear.

It is also to be understood that whatever be the inclination of the teeth in helical-cut gears, the direction of the thrust will depend on whether it is used as a driving or a driven element. With this construction greater road-clearance is attained and the advantageous use of smaller high-speed motors is rendered possible. The duplication of individual parts, as the shafts, "$S^1$ $S^2$", double ring gears "B", driving pinions "$p^1$ $p^2$", and permanent connecting gears "$g^1$ $g^2$" and likewise the bearings "$b^1$ $b^2$ $b^3$ $b^4$" all being thus interchangeable, simplifies and lessens cost of manufacture and repairs. The net result also of the distribution and lessening of direct stresses in and between driving elements and the neutralizing of end and side thrusts gives to the system a greater ratio of propelling efficiency; and smoother action.

The direct drive, as will be obvious, is through shaft "$S^1$" and pinion "$p^1$" to ring gear "B" and at the same time indirectly by gears "$g^1$ $g^2$" to auxiliary shaft "$S^2$" and pinion "$p^2$" to ring gear "B."

Employing the same construction and relation of parts together with certain additions, as shown in the drawing Fig. 2, an additional speed drive may be obtained without lessening the advantages above indicated. The principal elements of addition are two double spur gears, carried normally loose in relation to the shafts "$S^1$ $S^2$" respectively, in constant mesh and connectible therewith by splined clutches "$C^1$ $C^2$." The gear element for the main shaft "$S^1$," consists of a somewhat enlarged drum or cup, "$d^1$," open at the rear and closed at the front or bottom, having an integral axial extension "S" outward from the bottom as, in effect, an extension part of the main shaft carried in the bearing "$b^5$." At each end of the drum and integral therewith, is an external circumferential set of spur-gear teeth "$g^3$," with annular space between of sufficient width and depth to accommodate a bearing "$b^7$" preferably of the Hyatt type. Axially within the open end of the drum extends the terminal end of the main shaft "$S^1$," journaled in a pilot-bearing "$b^9$" (preferably of the Hyatt type) occupying the annular space surrounding the shaft within the cylindrical wall of the drum.

A similar drum-structure "$d^2$," but provided integrally with a single set of gear teeth "$g^4$" at the rear end, the second set being formed in the periphery of an added plate "$g^6$" and carried in bearings "$b^8$" receives axially the terminal of shaft "$S^2$" in an annular pilot bearing "$b^{10}$" in the same relation as shown for the similar parts relating to shaft "$S^1$." The drum "$d^2$" has a short axial projection "$s^2$" outward from its bottom wall serving as a centering guide for a plate or spur gear "$g^6$" to be fixedly attached to the drum "$d^2$," completing the double gear corresponding with the opposite intermeshing gear "$g^3$" of the main shaft.

The gear plate "$g^6$" is slightly countersunk to fit upon the drum "$d^2$" the bottom end of which is provided with abutments "$x$" engaging corresponding recesses of the gear "$g^6$," and the gear is held to place by a nut "$y$" threaded on the extension "$s^2$".

The drive for high speed,—the additional gears "$g^3$ $g^4$ $g^6$" being normally loose—clutch "$C^1$" connects-in shaft "$S^1$" for direct, as already described. If now clutch "$C^1$" is disconnected and clutch "$C^2$" thrown in, the drive is through double gear "$g^3$" and its intermeshing gears "$g^{4-6}$" to shaft "$S^2$" and pinion "$p^2$," and at the same time through gears "$g^1$ $g^2$" and pinion "$p^1$" to ring gear "B."

Thus in both transmissions, the delivery of power is always divided equally—as is the resistance inertia—between the two pinions.

There is thus constituted an exceptionally compact, strong and durable structural system involving transmissions of power to the best advantage and capable of enlargement as to range of speeds practically by mere addition. This primary skeleton, so to speak, is composed of duplicated interchangeable parts, tending to improved fitting and adjustment, and to lessened cost, reduced wear, and longer life with fewer repairs even in hard service.

As applied to truck service it dispenses entirely with worm gear, enabling the operator to take full advantage of pneumatic tire equipment, and drive part of the time with light load or empty, with greater speed of truck without sacrificing pulling power on gradients; and, conversely, prevents straining and racing of the motor with consequent wear on bearings, etc., with two speeds of widely different gear-ratios, both quiet and efficient. These desirable results are consistent with the use of higher speed, and relatively small motors operating under conditions giving highest efficiency.

It will be obvious that while the use of helical or spiral cut teeth is to be preferred, it is not vitally essential to the realization of many of the advantages resulting from my invention. It is important, however, in permitting a greater gear reduction without diminishing road clearance. I do not, therefore, wish to be confined to the use of helical cut gears. They may be omitted altogether or used in certain connections only.

I claim as my invention and desire to secure by Letters Patent of the United States:

1. In a transmission gear system of the character indicated, a structural unit independent of the speed changing mechanism, embodying in combination a yoke-shaped supporting frame adapted to engage the axle casing at its arm terminals; main and auxiliary shafts in parallel centrally located between the side arms of the yoke carrying equal terminal bevel pinions adapted to engage a double ring gear in constant mesh at opposite sides; equal spur gears in constant mesh on and between said shafts; a cross-bar support for the shafts adjacent to and between the said pinions and gears; and a similar cross support adjacently forward of the spur gears.

2. A system of driving mechanism of the character indicated, embodying a divided ultimately driven shaft or axle provided with a differential and its revolving casing; a double bevel ring gear having helical teeth and oppositely seated on said casing; a main and an auxiliary shaft carried at right angles to the axle; two terminal bevel pinions having helical teeth carried on said shafts in constant mesh with said ring gear at opposite sides; and intermeshing spur gears on said shafts having helical teeth; the teeth of the main shaft gear being inclined oppositely to those of the bevel pinion on said shaft and also to those of its intermeshing gear upon the auxiliary shaft.

3. A system of driving mechanism of the character indicated, embodying a divided shaft provided with an incased standard differential; a double-bevel annular ring gear fixedly connected therewith; two interchangeable driving shafts carried in parallel bearings at right angles with the divided shaft; terminal bevel pinions on said shafts in constant mesh at opposite sides of the ring gear; and intermeshing spur gears of equal pitch diameter fixed one upon each of said shafts, said gears and pinions having helically cut teeth and arranged with opposite inclinations tending to equalize and absorb thrust action.

4. A system of drive mechanism embodying a differential casing provided with a circumferential flange; duplicate bevel ring gears secured together back to back through said flange; integral duplicate driving shafts arranged in parallel in suitable bearings; driving pinions secured terminally one upon each said shaft in constant mesh with said ring gears; and intermeshing spur gears on said shafts,—said ring gear, pinions and spur gears having corresponding inclined teeth to minimize or absorb thrust.

5. In a system of driving mechanism of the character indicated having a main and an auxiliary shaft carrying intermeshing spur gears for speed changes, a main shaft extension having a cup-shaped head adapted to fit over and carry the forward terminal portion of the main shaft as in a journal bearing, said head being provided with a set of external helically cut gear teeth at each end oppositely inclined each to the other with provision for a bearing between; and a longitudinal extension of said head for bearing purposes.

In testimony whereof I have hereunto set my hand in presence of two subscribing witnesses.

WILLIAM FRANKLIN PENROD.

Witnesses:
  LEWIS M. HOSEA,
  NORMA D. BERGER.